(12) United States Patent
De Lisi

(10) Patent No.: US 9,695,554 B2
(45) Date of Patent: Jul. 4, 2017

(54) COMPOSITE RAILWAY SLEEPER

(71) Applicant: GREENRAIL S.r.l., Palermo (IT)

(72) Inventor: Giovanni Maria De Lisi, Bagheria (IT)

(73) Assignee: GREENRAIL S.R.L., Palmero (IT)

( * ) Notice: Subject to any disclaimer, the term of this patent is extended or adjusted under 35 U.S.C. 154(b) by 0 days.

(21) Appl. No.: 14/404,780

(22) PCT Filed: Jan. 13, 2014

(86) PCT No.: PCT/IB2014/058216
§ 371 (c)(1),
(2) Date: Dec. 1, 2014

(87) PCT Pub. No.: WO2014/108868
PCT Pub. Date: Jul. 17, 2014

(65) Prior Publication Data
US 2015/0308051 A1    Oct. 29, 2015

(30) Foreign Application Priority Data

Jan. 14, 2013   (EP) .................................... 13425007

(51) Int. Cl.
*E01B 3/36*        (2006.01)
*E01B 3/44*        (2006.01)
(52) U.S. Cl.
CPC . *E01B 3/36* (2013.01); *E01B 3/44* (2013.01)
(58) Field of Classification Search
CPC ..... E01B 3/28; E01B 3/30; E01B 3/32; E01B 3/34; E01B 3/36; E01B 3/38; E01B 3/40; E01B 3/46; E01B 3/44
USPC ...................................... 238/349, 85, 88, 93
See application file for complete search history.

(56) References Cited

U.S. PATENT DOCUMENTS

| 1,074,014 | A | * | 9/1913 | Proctor | ..................... E01B 3/26 238/106 |
| 5,096,119 | A | | 3/1992 | Schultheiss et al. | |
| 5,713,518 | A | | 2/1998 | Fox et al. | |
| 6,029,048 | A | * | 2/2000 | Treatch | ................ H04B 7/2609 455/11.1 |
| 6,179,215 | B1 | * | 1/2001 | Shea | ......................... E01B 3/46 238/29 |

(Continued)

FOREIGN PATENT DOCUMENTS

| AU | 2007 100 262 A4 | 5/2000 |
| CN | 1049881 A | 3/1991 |

(Continued)

OTHER PUBLICATIONS

Fernandez, Eva, "International Search Report and Written Opinion for PCT/IB2014/058216," European Patent Office, Apr. 29, 2014.

*Primary Examiner* — Mark Le
(74) *Attorney, Agent, or Firm* — Florek & Endres PLLC

(57) ABSTRACT

A composite railway sleeper (1; 50; 100) comprising an outer coating shell (2; 51; 101) made of composite plastic material and a shaped structural core (3; 52; 102), made of a material comprising at least concrete contained within said outer coating shell (2; 51; 510; 101), wherein said outer coating shell (2; 51; 510; 101) presents in the upper outer face (2*a*; 51*a*; 101*a*) two distinct and opposite groups of grooves (4; 53) suitable to receive the angular guide plates (G) belonging to pre-assembled elastic type fastening systems (64) for the connection of two respective rails (R) with said railway sleeper (1; 50; 100).

18 Claims, 15 Drawing Sheets

(56) References Cited

U.S. PATENT DOCUMENTS

| | | | | |
|---|---|---|---|---|
| 6,459,050 B1* | 10/2002 | Muhs | ............... | G01G 19/022 |
| | | | | 177/133 |
| 7,950,592 B2* | 5/2011 | Yuan | ............... | B29C 47/0016 |
| | | | | 238/84 |
| 8,593,036 B2* | 11/2013 | Boysel | ............ | H01L 41/1136 |
| | | | | 310/339 |
| 2002/0145350 A1* | 10/2002 | Henderson | ............ | A43B 3/00 |
| | | | | 310/112 |
| 2006/0276076 A1* | 12/2006 | Alvarado | ............ | H01R 13/66 |
| | | | | 439/502 |
| 2008/0035747 A1 | 2/2008 | Yuan | | |
| 2008/0105758 A1* | 5/2008 | Schwiede | ............ | E01B 9/303 |
| | | | | 238/349 |
| 2012/0091287 A1* | 4/2012 | Djerf | ................. | B61L 1/02 |
| | | | | 246/1 C |
| 2012/0248215 A1* | 10/2012 | Sadeghi | ............... | E01B 3/34 |
| | | | | 238/54 |

FOREIGN PATENT DOCUMENTS

| | | | |
|---|---|---|---|
| CN | 1712637 A | 12/2005 | |
| CN | 102 251 443 A | 11/2011 | |
| DE | 2951272 A1 | 7/1981 | |
| WO | WO 97/20108 A1 | 6/1997 | |
| WO | WO 00/28144 A1 | 5/2000 | |
| WO | 2012/058447 A2 | 5/2012 | |

\* cited by examiner

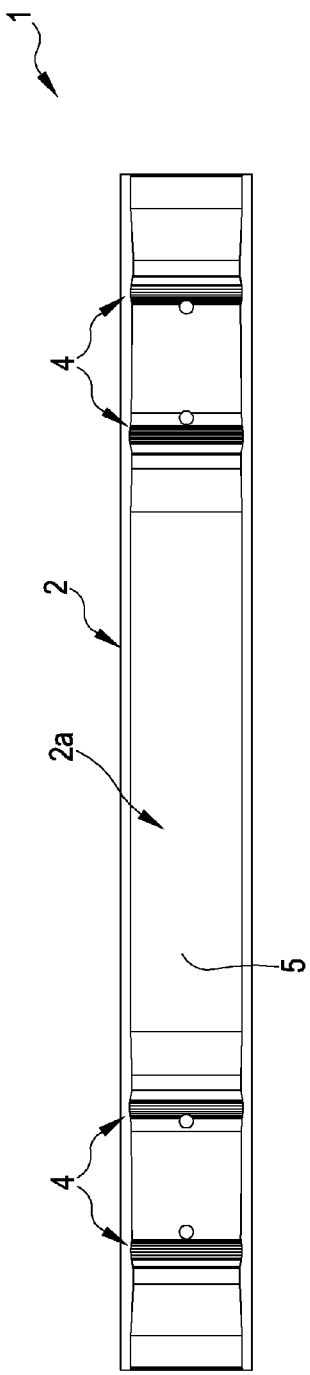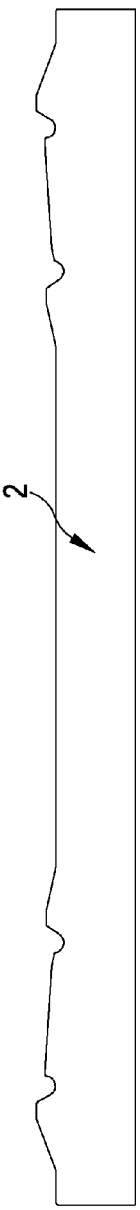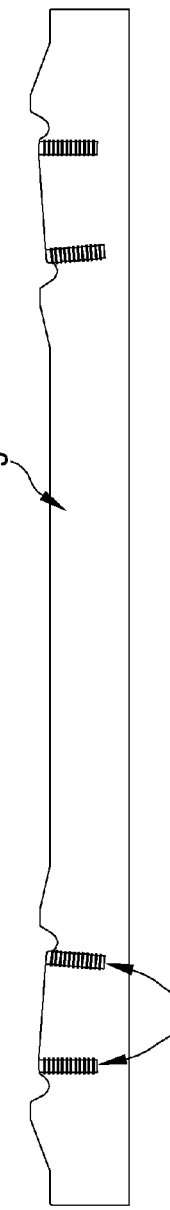
FIG.2
FIG.3
FIG.4

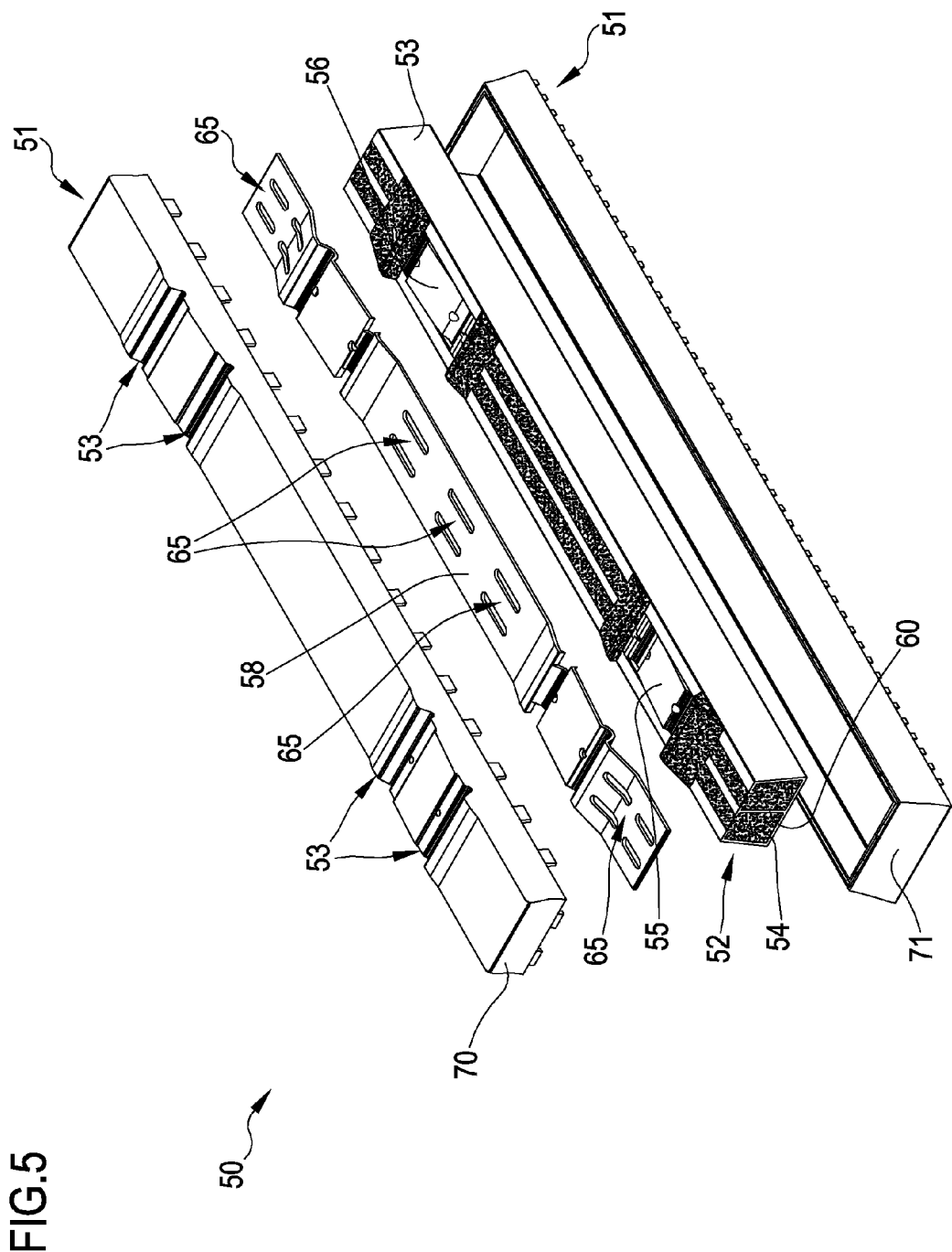

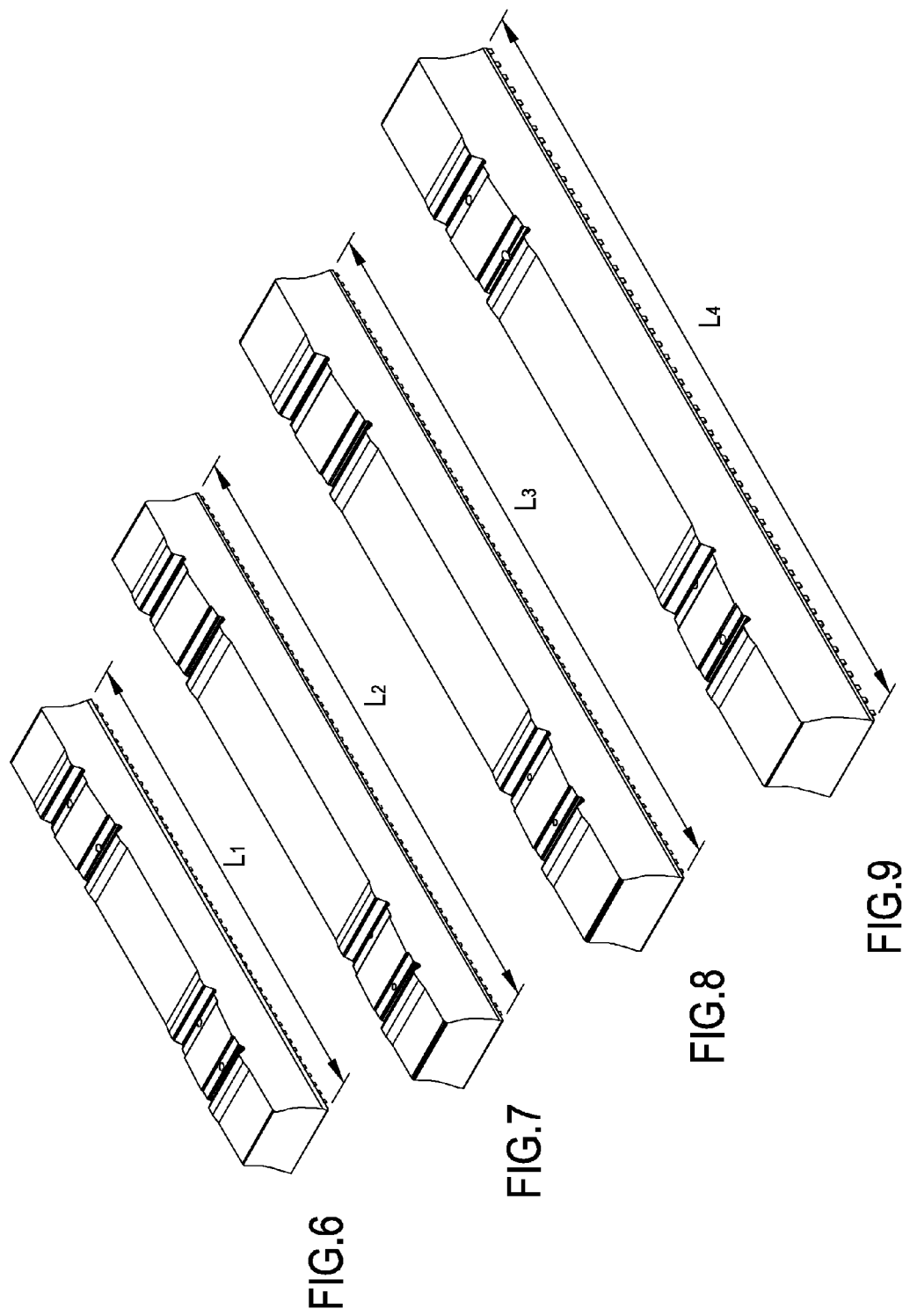

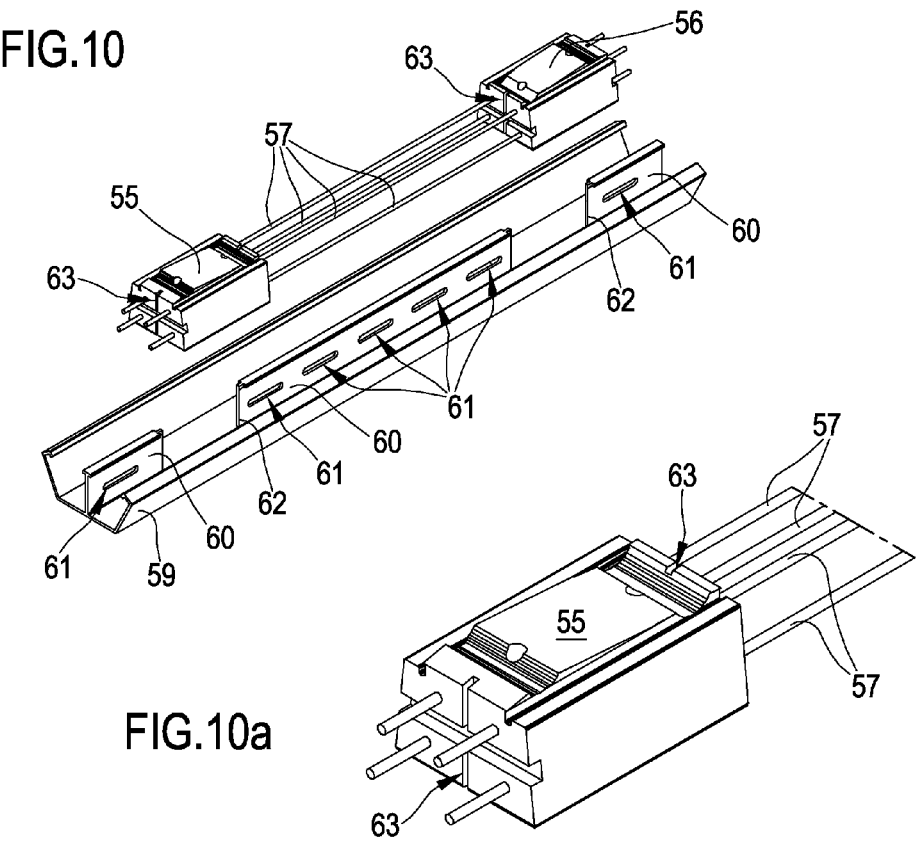
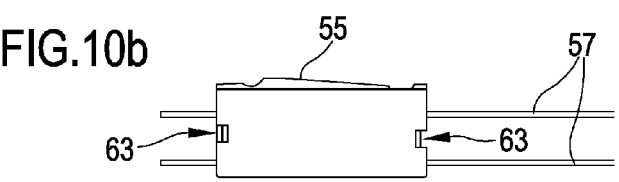
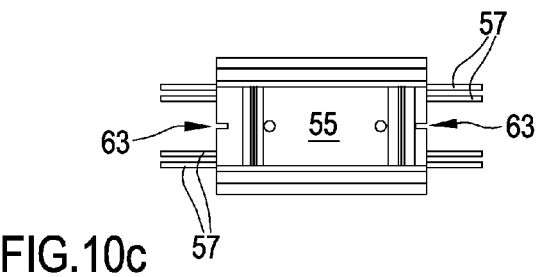
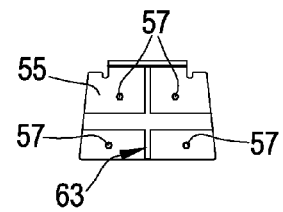

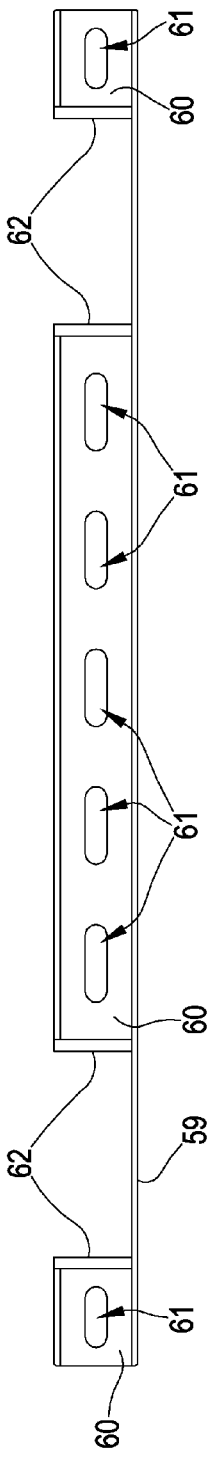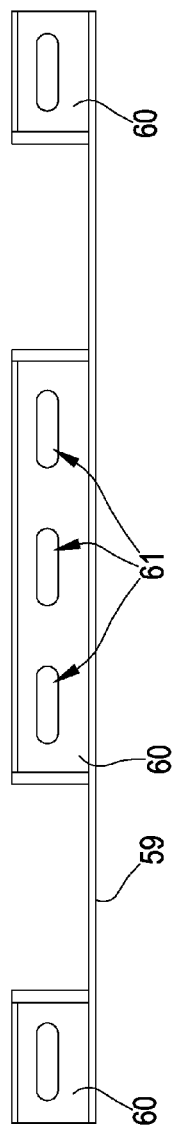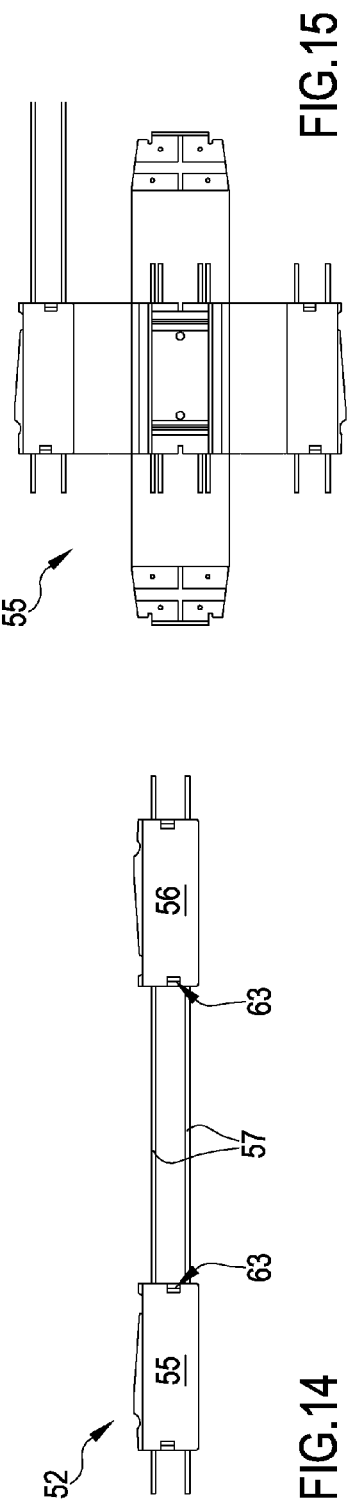

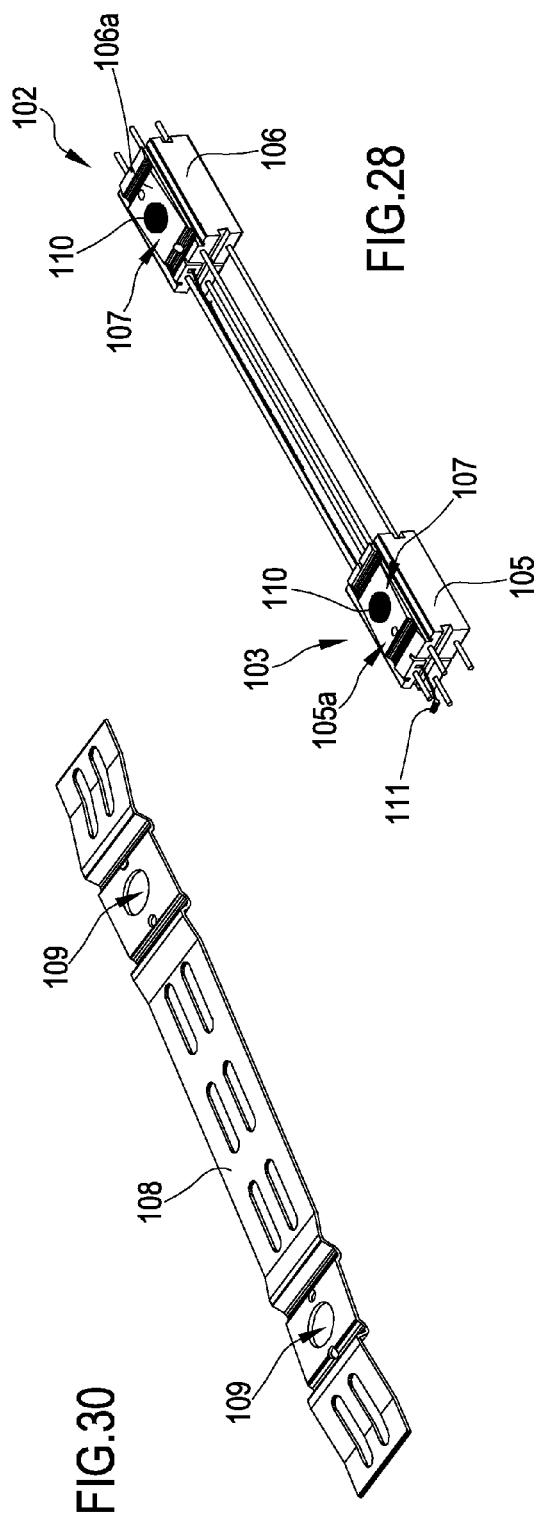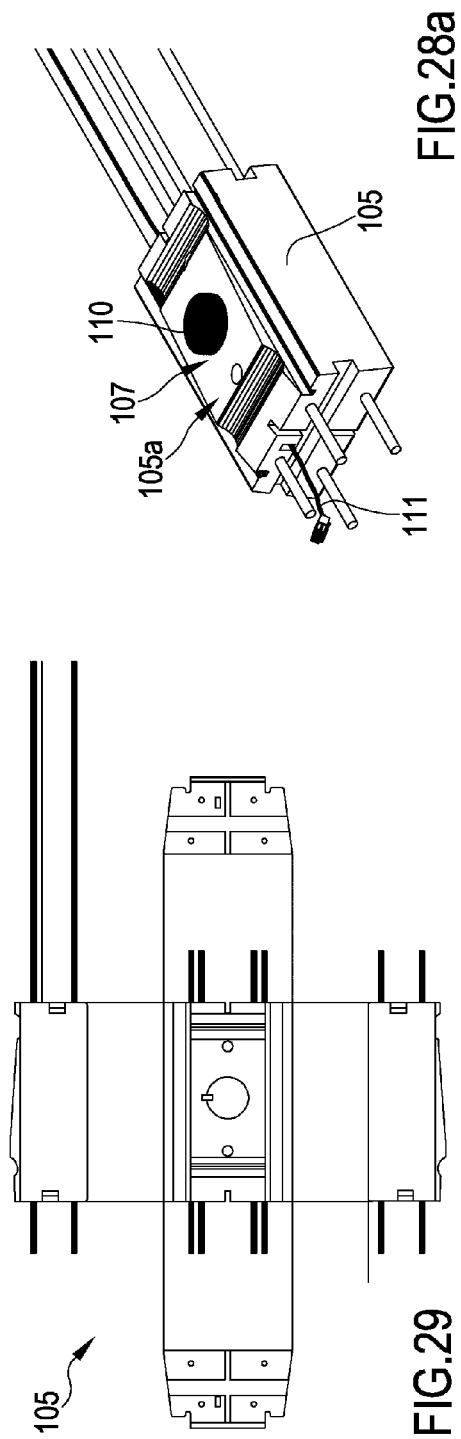

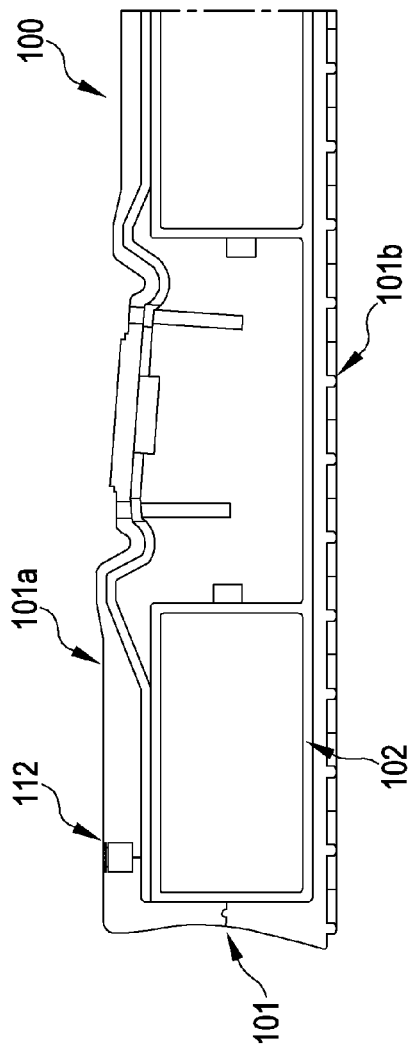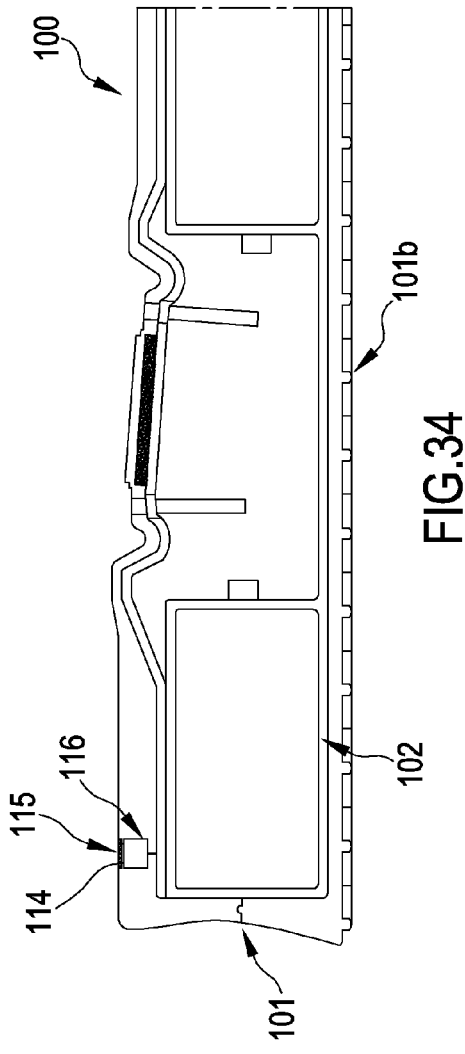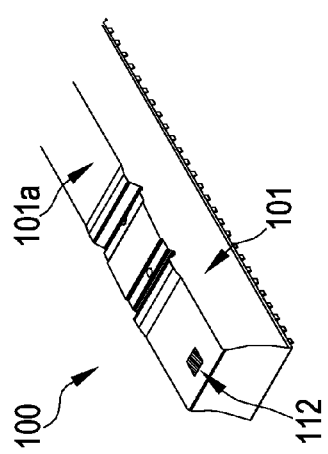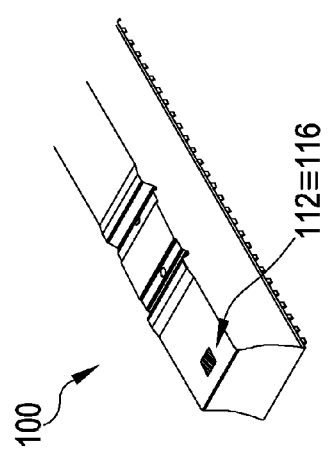

COMPOSITE RAILWAY SLEEPER

REFERENCE TO RELATED APPLICATIONS

This application is the National Phase filing of PCT/IB2014/058216, filed on Jan. 13, 2014.

FIELD OF THE INVENTION

The present invention concerns an innovative and eco-friendly composite railway sleeper, which possesses unique technical features that allow its introduction into the world market in replacing of the existing railway sleepers made of wood, concrete, steel, plastic and composite materials.

BACKGROUND OF THE INVENTION

Railway sleepers are an integral part of the "railroad track system" and are there to ensure the constant distance between the two rails, or more precisely, the distance between the inner sides of the mushrooms of the two rails forming the track and normally measured at the height of 14 mm below the rolling floor (so-called "gauge" in railway field) and to share the mechanical loads on the roadbed (or foundation bed, also known by the English term "ballast").

It should be noted that the ballast is the part of the railway superstructure traditionally although not exclusively consisting of a cushion of crushed rock that supports the track drowned in it; moreover, the ballast ensures the geometric design conditions (level and alignment), absorbs the efforts exercised by the movement of the trains, gives elasticity to the track and creates a filter between track and environment in relation to vibrations.

As known, the railway sleeper made of wood has been for many years the most popular one in the market for railway installations but has created significant environmental damages in terms of deforestation and pollution of the subsoil by creosote.

Wood railway sleepers, indeed, were impregnated with creosote oil, a complex preservative chemical mixture which makes the wood resistant to attack by animal, plant pests and weather agents ensuring work durability of the sleepers themselves. Rail fastening systems used for wood railway sleepers have now become obsolete and expensive in terms of installation and maintenance as well as safety.

Furthermore, flexibility and lightness of wood railway sleepers have caused, and continue to cause in the few cases of use, problems related to pumping and dispersion of the ballast, thus increasing the need for burdensome and always unwanted maintenance interventions and related costs.

In addition, although they are impregnated with creosote oil, the average length of the life cycle of wood railway sleepers is not more than 15 years; this means high costs for replacing and disposing the sleepers nearly unusable because classified as special highly toxic waste.

Other problems related to the use of wood railway sleepers are related to the systems used for coupling of the rail, since wood degradation leads to non-compliance with the prefixed 3.0 safety standards, especially regarding the tightness of the fastening systems of the rail.

At present wood railway sleepers are used only in sections of line with narrow curve radii, since they allow, during installation, adjustment of the gauge and, therefore, adjustment of the distance of the two rails.

The technology in the railway field has developed over the years for new types of sleepers, the most common of which is that one is made of prestressed reinforced concrete (also known by the acronym PRC).

Although they have an average life longer than wood, calculated from 20 to 25 years, PRC railway sleepers have shown some defects that involve equally high maintenance costs and safety issues.

Indeed, PRC railway sleepers are used in high-speed tracklines of the trains whose high loads subject the superstructure to heavy stresses; said loads, in combination with rigidity and weight of the sleepers themselves, as well as speed of the trains, cause pulverization of the ballast underneath which is reduced in sand becoming a soft and weak support system such that it does not ensure the proper and original altimetric and longitudinal features of the track.

Another obvious drawback related to the rigidity of the railway sleepers made of PRC is the structural weakening (caused by fractures, cracks and breaks) to which they are constantly subjected.

Railway sleepers of more modern and developed constructive conception, made at least partly of plastic material with high mechanical strength—hence the availability, on one hand, of railway sleepers integrally of plastic material and, from the other hand, of composite railway sleepers, composed of parts made of plastic material and parts made of concrete and/or metallic material such as typically steel), seek to remedy these drawbacks.

Such railway sleepers of known type, made of plastic material, present a completely homogeneous and uniform outer surface, without points of discontinuity.

However, while allowing to drastically limit the negative phenomenon of the pulverization of the ballast ensuring lengthening of the life cycle of the railway sleepers, they have found very little if null use in the high speed tracklines typical of European network, for which they result fully unsuitable and inadequate: this is due to their strong lightness which makes them suitable to be used in tracklines of a railway train not exceeding 80 km/h, typical for instance of U.S. and Chinese railway networks.

In addition, plastic material railway sleepers of the prior art cannot be used in the presence of elastic type fastening systems with direct laying of the rail on the sleeper and therefore they cannot be installed using mechanized installation or renewal of tracks systems and above all they involve complicated, toilsome, invasive, lengthy and expensive fitting works for mounting fastening elements that connect the rails with the sleepers themselves.

Rail fastening systems used on these plastic material railway sleepers are the same fastening systems with indirect laying used on wood sleepers, which are obsolete and highly expensive compared to the much safer and more economical elastic type fastening systems with direct laying of the rail matching, up to now, only the PRC sleepers.

SUMMARY OF THE INVENTION

The present invention seeks to overcome the drawbacks of the prior art just mentioned.

In particular, a main purpose of the invention is to provide a composite railway sleeper that is able to combine the advantages of the traditional railway sleepers made of concrete (or prestressed reinforced concrete), suitable for high speed tracklines, with the advantages of the newer but less widespread railway sleepers made at least partly of plastic material, suitable only for low speed tracklines (not more than 80 Km/h), obtaining benefits not even remotely achieved by the railway sleepers of the current state of the art.

More in detail, a primary purpose of the invention is to devise a composite railway sleeper which, while limiting the pulverization of the foundation bed (ballast or rubble) on which it stands, allows easy and rapid application in work, by means of mechanized systems, adopting rail elastic fastening systems with direct laying or "W" type (within the meaning that these terms and expressions normally take in the railway sector) pre-assembled at factory which in turn allow the connection of the rails to the sleeper itself without needing invasive and expensive, therefore always unwanted, fitting works and which may be used for high speed tracklines (even higher than 250 Km/h).

Within this purpose, it is task of the present invention to make available a composite railway sleeper which improves compared to known type equivalent sleepers, used in high speed tracklines, the strength to lateral displacement of the track due to the passage of trains which, as known, while transiting, exert lateral forces on the track itself.

It is a further purpose of the invention to provide a composite railway sleeper which compared to known railway sleepers of similar application (for high traveling speed of trains) cuts down transmitted vibrations, reduces freezing/thawing phenomena and has higher structural durability.

Said purposes are achieved by a composite railway sleeper according to the present invention.

More technical features of detail of the composite railway sleeper are contained in the corresponding dependent claims.

A railway track according to the present invention concurs to achieve the prefixed purposes.

The claims as specifically and concretely defined, are an integral part of the present description.

The railway sleeper referred to in the present invention thus falls within the category of composite sleepers: it is essentially constituted by an inner steel structure weighted by concrete filling and by an outer coating shell made of composite material preferably obtained from a mixture of plastic and recycled rubber.

Such railway sleeper combines the features listed below that make it competitive and better in several aspects compared to the known sleepers made in any other material.

Compared to the current state of the art, the composite railway sleeper, referred to in the present invention, has a predisposition for the use of "W" elastic type fastening systems with direct laying of the rail, (generally known in jargon as SKL14 "Vossloh" or "Schwihag" fastening systems or similar), even for high speed.

These rail fastening systems are today exclusively matched to railway sleepers made of prestressed reinforced concrete (PRC) that however, as mentioned, generate significant problems of pulverization of the ballast, and no composite sleeper currently available on the market, whether it is produced and/or patented, allows their use.

The use of these fastening systems in the composite railway sleeper referred to the present invention provides, compared to other composite sleepers of known type, a greater safety since the tightening screw of the fastening system is screwed inside the block (preferably made of rubber) placed in the under-rail section.

This entails that the screw shows tear strength higher than any other type of railway sleeper used today.

Furthermore, the aforesaid block, thanks to its plastic nature, is able to absorb and release the vibrational efforts that the screw receives.

In addition, "W" elastic type fastening systems with direct laying of the rail are, as known, pre-mounted (or pre-assembled) at factory: this allows a greater speed in the phase of laying of the railway sleeper during construction, maintenance and renovation works of all the railway lines, both with manual systems and with mechanized systems.

Elastic type fastening systems used by the composite sleeper of the present invention are widely used worldwide. This determines that the machines used for track-laying and fixing of said fastening systems of the rail are the same used in the state of the art by experts.

"W" elastic type fastening systems with direct laying of the rail, commonly called SKL14 "Vossloh" or "Schwihag" (from the name of the main manufacturers) or similar, allow the adjustment of the gauge thanks to the interchangeability angular guide plates directly coupled with the railway sleepers.

This interchangeability allows adjustment of the gauge from 1,435 mm to 1,465 mm in the conventional lines and from 950 mm to 980 mm in the narrow-gauge lines.

Use of these elastic type rail fastening systems, in the railway sleeper referred to in the present invention, allows, therefore, use of said sleeper also in railway tracks with narrow curve radii.

The geometric and structural features of the composite railway sleeper, according to the present invention, allow to reach a weight such that said sleeper can be used in high capacity and high speed lines.

Furthermore, the particular geometrical shape, weight and type of material used for the outer coating (plastic and rubber recycled) ensure a strength to lateral displacement of the track greater than any other sleeper used today.

The preferred "S" shape of the side faces of the short side and the reticular pattern of the lower face of the outer coating shell help to increase the strength to lateral displacement of the tracks because they increase and improve the interaction forces between ballast and sleeper.

Said features are typical of the outer coating shell both in the two parties shape and in the single body shape.

The outer coating shell of the composite railway sleeper, referred to in the present invention, is preferably formed by a mixture of recycled plastic and rubber and ensures to the sleeper a work life greater than 50 years keeping unchanged its structural of efficiency and reliability features: the inner structural core is, indeed, advantageously preserved from the attack of weather agents, musts and mildews, typically found in PRC railway sleepers of the prior art whose life, indeed, is of the order of 20 years.

Thanks to the inert nature of the material that forms it, the coating shell is not an element of contamination of the environment, contrary to what happens for example with the known railway sleepers made of wood that are treated with chemicals in order to improve their functionality and life.

Strength of the outer coating shell of the composite railway sleeper of the invention is the total strength to fire and high temperatures which makes the sleeper itself very safe for use in tunnels, bridges, urban and metropolitan areas.

The material used for the outer cover has a particular chemical formulation such as to ensure shielding to UV-A and UV-B.

Also the composite railway sleeper, referred to in the present invention, keeps the dimensional consistency over time; indeed, said sleeper does not undergo deterioration such that to cause neither dimensional nor structural changes thus keeping the original features and ensuring safety standards over time.

The composite railway sleeper, referring to in the present invention, allows the reduction of maintenance costs of the railway line because the plastic nature of the outer cover absorbs more gradually, compared to the traditional PRC sleeper, the load efforts at the passage of the train.

This shock absorbing function of the outer coating shell minimizes crushing of the ballast: this aspect helps to reduce maintenance costs related to the reconstruction of the ballast and continuous levelling and height alignment of the line, costs that heavily and undesirably weigh on the financial statements of the railway companies.

Still advantageously, the outer structure gives the composite railway sleeper, according to the present invention, anti-noise and anti-vibration features.

Therefore, by virtue of the lower vibration and a better damping of the structure, relevant benefits concerning line maintenance are achieved.

Equally advantageously, the shock absorbing function reduces noise pollution and vibrations due to the train causing damages to the architectural structures that fall near or over the railway lines.

According to a preferred embodiment of the invention, the composite railway sleeper is arranged for housing a system of piezoelectric type aimed at the production and networking of electricity.

Pressure loading on the sleeper at the passage of the train on the rails actuates, by pressing, such piezoelectric system which produces electricity and transfers it to an external accumulator by means of a cable wiring.

Currently, this system to produce electricity, through piezoelectric system, has only been tested on an experimental basis in prestressed reinforced concrete sleepers. This system in the known PRC sleepers is mounted by drilling a housing hole in the concrete, at the under-rail section and by wiring the assembly through external cables which, beyond to be in an interference position and therefore not allow carrying out of the normal lines maintenance and leveling workings, are subject to wear or breakage.

According to the present invention, the piezoelectric system finds a natural and harmonious housing within the composite railway sleeper, as it is already pre-inserted during production phase.

This allows to avoid altering or modifying a pre-existing structure, as it happens today with PRC sleepers.

Furthermore, the composite railway sleeper, referred to in the present invention, preferably has a special room, made inside the outer coating shell at the under-rail section, suitable to contain a plate provided with an integrated satellite data transmission system that is activated by the passage of the convoy and transmits in real time the following data: train speed, train length, wagons number, track conditions, distance between two consecutive trains and distance between two opposite trains.

The composite railway sleeper, according to the present invention, is designed to be produced in various sizes. This allows the use of such a sleeper in any railway system such as: high-speed lines, high capacity lines, conventional lines, metropolitan lines, tram lines and narrow gauge lines.

BRIEF DESCRIPTION OF THE DRAWINGS

Further features and specifications of the invention will become more apparent from the following description, related to preferred embodiments of the composite railway sleeper which exclusive right is herewith claimed, given by indicative, but not limitative, way with reference to the appended drawings, in which:

FIG. 2 is a plan view of the composite railway sleeper of FIG. 1;

FIG. 3 is the side view of the composite railway sleeper of FIG. 1;

FIG. 4 is the view of the shaped structural core of the composite railway sleeper of FIG. 1 according to a longitudinal section plane;

FIG. 5 is an exploded assonometric view of a first possible embodiment of the composite railway sleeper of FIG. 1;

FIGS. 6-9 are assonometric views of four distinct embodiments of the composite railway sleeper of FIG. 5, which differ each other in length;

FIG. 10 is a partial and partly exploded assonometric view, in a not definitive configuration, of the shaped structural core of the composite railway sleeper of FIG. 5;

FIG. 10a is a truncated enlargement of a constructive assembly of FIG. 11;

FIG. 10b is the front view of FIG. 10a;

FIG. 10c is the plan view of FIG. 10a;

FIG. 10d is the side view of FIG. 10a;

FIG. 12 is the side view of FIG. 11;

FIG. 13 is an embodiment of FIG. 12;

FIG. 14 is the assembled and definitive side view of FIG. 10;

FIG. 15 is the view of the schematic and theoretical development on a plane of one of the two main blocks of FIG. 14;

FIG. 28 is a partial assonometric view of an embodiment of the shaped structural core of FIG. 10;

FIG. 28a is a truncated enlargement of a constructive assembly of FIG. 28;

FIG. 29 is the view of the schematic and theoretical development on a plane of one of the two main blocks of FIG. 28;

FIG. 30 is the assonometric view of the reinforcement plate of the shaped structural core of FIG. 28, an embodiment of the reinforcing plate of FIG. 5;

FIG. 31 is the truncated assonometric view of another embodiment of the composite railway sleeper of FIG. 1;

FIG. 32 is an enlargement of FIG. 31 according to a longitudinal section plane;

FIG. 33 is the truncated assonometric view of another embodiment of the composite railway sleeper of FIG. 1;

FIG. 34 is an enlargement of FIG. 33 according to a longitudinal section plane.

DETAILED DESCRIPTION OF THE PREFERRED EMBODIMENTS

Figure 1:
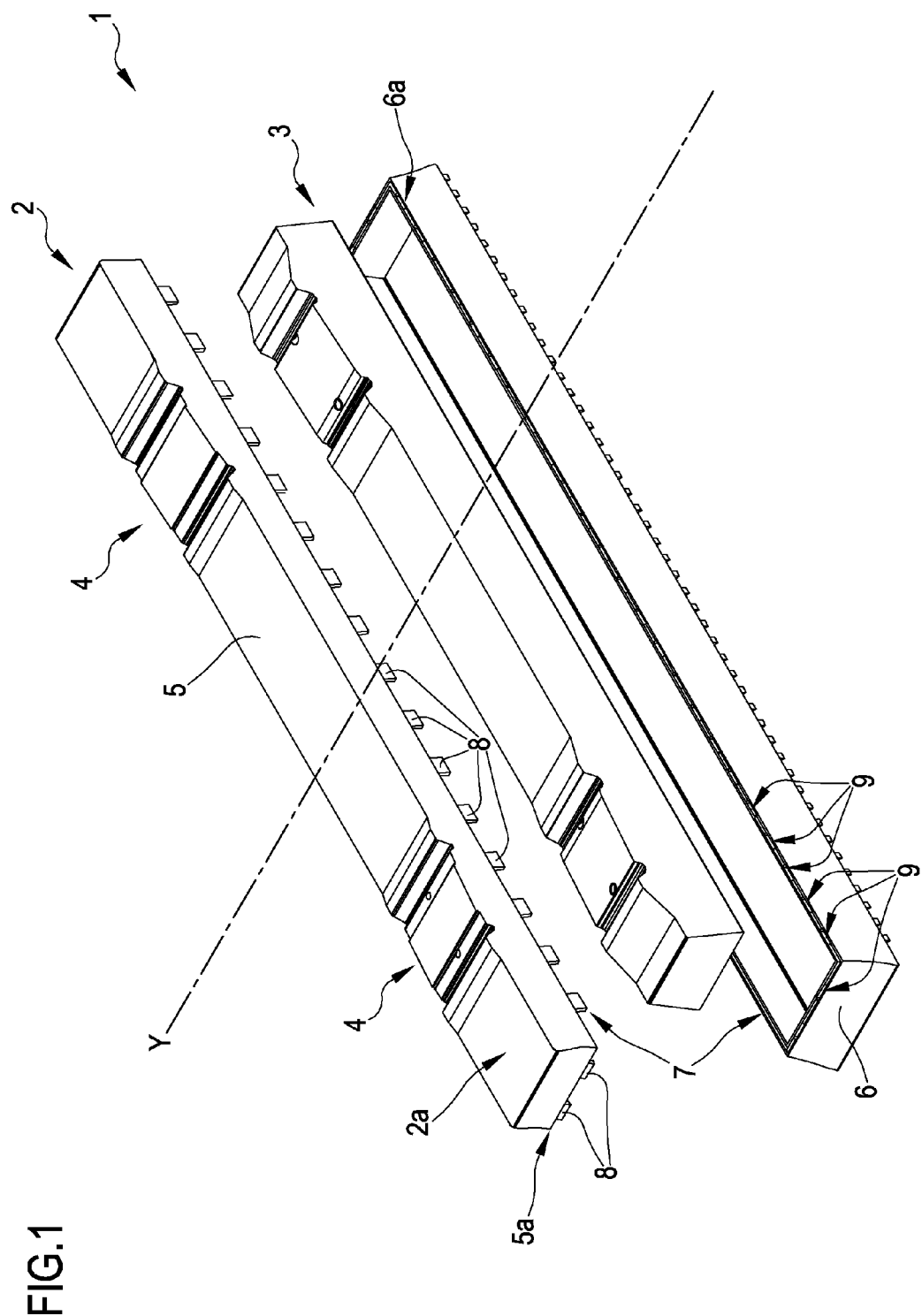
FIG. 1 is an exploded assonometric view of the composite railway sleeper of the invention.
Figure 11:
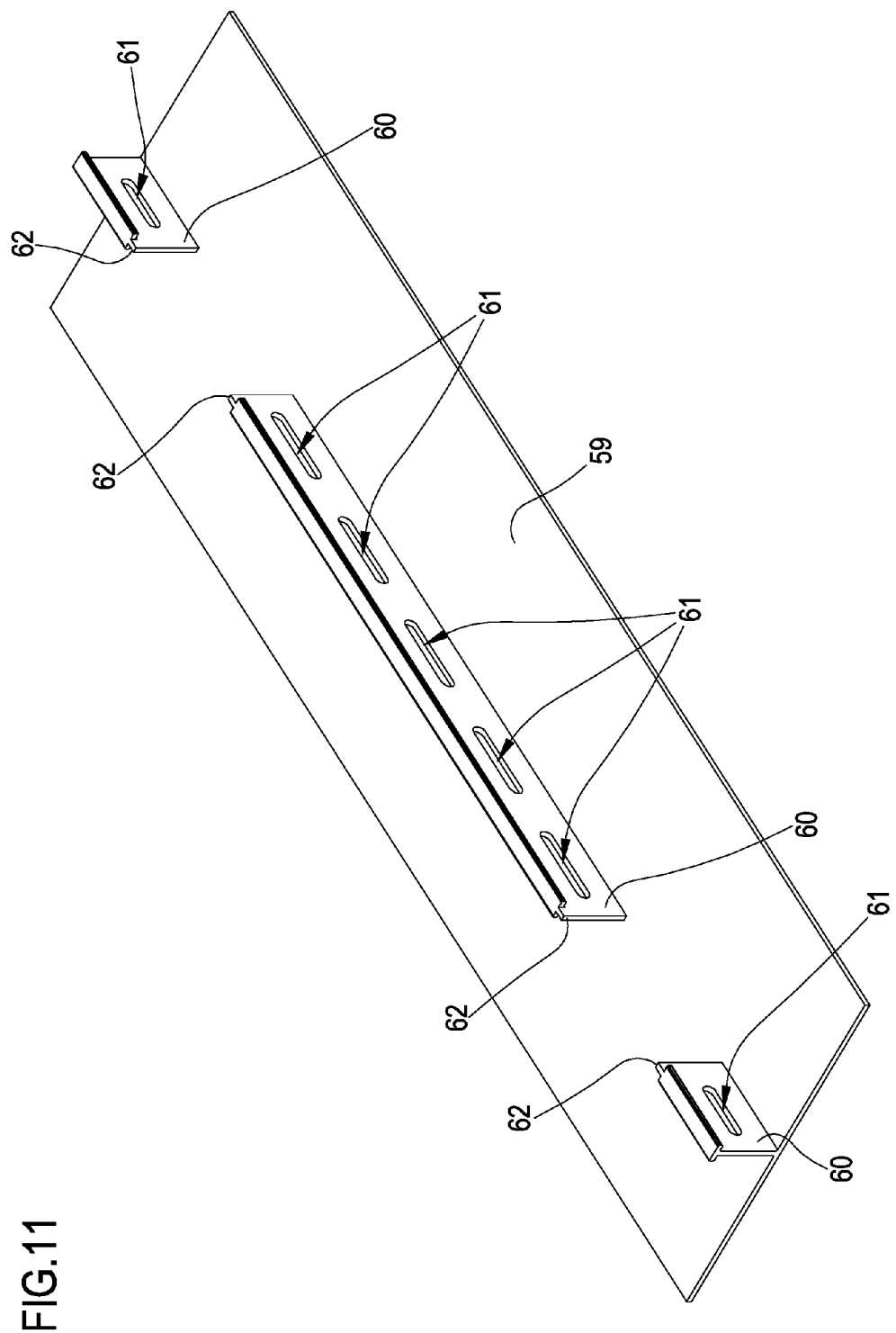
FIG. 11 is a particular still to be shaped of the composite railway sleeper of FIG. 5.

The composite railway sleeper of the invention is illustrated in its basic version in FIG. 1, where it is globally numbered with 1.

As it can be seen, the composite railway sleeper 1 includes:

an outer coating shell 2 made of composite plastic material;

a shaped structural core 3, made of a material comprising only concrete or prestressed reinforced concrete) contained within the outer coating shell 2.

In accordance with the invention, the outer coating shell 2 presents in the upper outer face 2a two distinct and opposite groups of grooves 4 suitable to receive the angular guide plates belonging to pre-assembled elastic type fastening systems (so-called "W" type) for the connection of two respective rails R with the railway sleeper.

In particular, the two distinct and opposite groups of grooves 4 are symmetrically arranged each other with respect to the transverse symmetry axis Y of the outer coating shell 2.

Preferably, the composite plastic material of the outer coating shell 2 comprises recycled plastic and/or recycled rubber.

More in detail, the recycled rubber advantageously but not exclusively comprises fragments, frayed fibres, granules or similar resulting from the shredding of end of life tires (EoLT) of vehicles.

FIG. 1, also, shows that, in this case, the outer coating shell 2 is an assembled body, being composed of an upper part 5 and a lower part 6 joined together by means of a coupling system, as a whole numbered with 7, and a high-strength glue, not represented.

More specifically, the coupling system 7 comprises shaped teeth 8 protruding from the lower perimetrical edge 5a of the upper part 5 and shaped slits 9 formed in the upper edge 6a of the lower part 6, in which said shaped teeth 8 engage, for example by joint or snap-fitting.

FIG. 4 also shows the position of the screw-nuts 10 in the shaped structural core 3, in which the locking screws, not shown, of the elastic type fastening system engage.

The following FIGS. 5-27 show a first possible embodiment of the invention in which the composite railway sleeper, now generally indicated with 50, is formed by:

an inner structure (or shaped structural core 52) consisting of a steel formwork (detail 53 in FIG. 5), concrete (detail 54 in FIG. 5), two composite shaped blocks (details 55 and 56 in FIG. 5) made of plastic material and recycled rubber resulting from EoLT (end of life tires), embedded in the concrete by means of four steel bars (details 57 in FIG. 10) at the under-rail sections;

a steel reinforcement plate (detail 58 in FIG. 5);

an outer structure consisting of a coating shell 51 made of recycled plastic material and recycled rubber resulting from EoLT (end of life tires) of special shape, geometry and design.

Such a composite railway sleeper 50 preferably has dimensions as follow: length of the inner structure equal to 234.50 cm and length of the finished product, provided with the outer coating shell 51, equal to 248.50 cm.

The process of production of the second embodiment described here of the composite railway sleeper 50 of the present invention starts from a steel support and containment sheet (detail 59 in FIGS. 10-13) on which three outlined stiffening engagements, for example made of steel and each having a T-shaped profile (details indicated with 60 in FIGS. 10 and 11) are welded, at the median axis of the short side.

Said outlined stiffening engagements 60 present some slots 61 allowing conjunction of the concrete between the right side and left side of the inner structure.

The outlined stiffening engagements 60 are welded on the steel support and containing sheet 59 by continuous wire welding and are positioned at a mutual distance such as to allow the coupling of the two shaped blocks 55 and 56 made of composite material according to appropriate distances and sizes.

In order to facilitate the engagement of the shaped blocks 55, 56, the stiffening engagements 60 present guide teeth (detail 62 in FIG. 10) that fit into a channel of vertical engagement 63 present in both sides of the block, as clearly visible in the details of FIGS. 10a-10d.

The composite shaped blocks 55, 56 (visible apart in FIG. 10a) are produced with a mixture of recycled plastic and rubber fragments obtained from EoLT (end of life tires).

These composite shaped blocks 55, 56 have a particular shape, geometry and design that allow, in combination with the particular geometry, size and shape of the outer coating shell 51, use of "W" elastic type fastening systems of the rail R with direct laying, commonly defined in the field with the term SKL14 "Vossloh" or "Schwihag" or similar—from the name of the manufacturers—.

The invention, supporting the use of this type of fastening systems, thus allows, compared to the state of the technique, gauge changes between the rails.

Moreover, thanks to the use of these elastic type fastening systems, the invention can be used in high speed and high capacity lines. The "W" rail fastening system, visible in figure where it is overall numbered with 64, is a type of sleeper/rail attachment pre-assembled on the railway sleeper 50 during the construction at factory, at the two groups of grooves 53 made in the upper outer face 51a of the outer coating shell 51.

Figure 16:
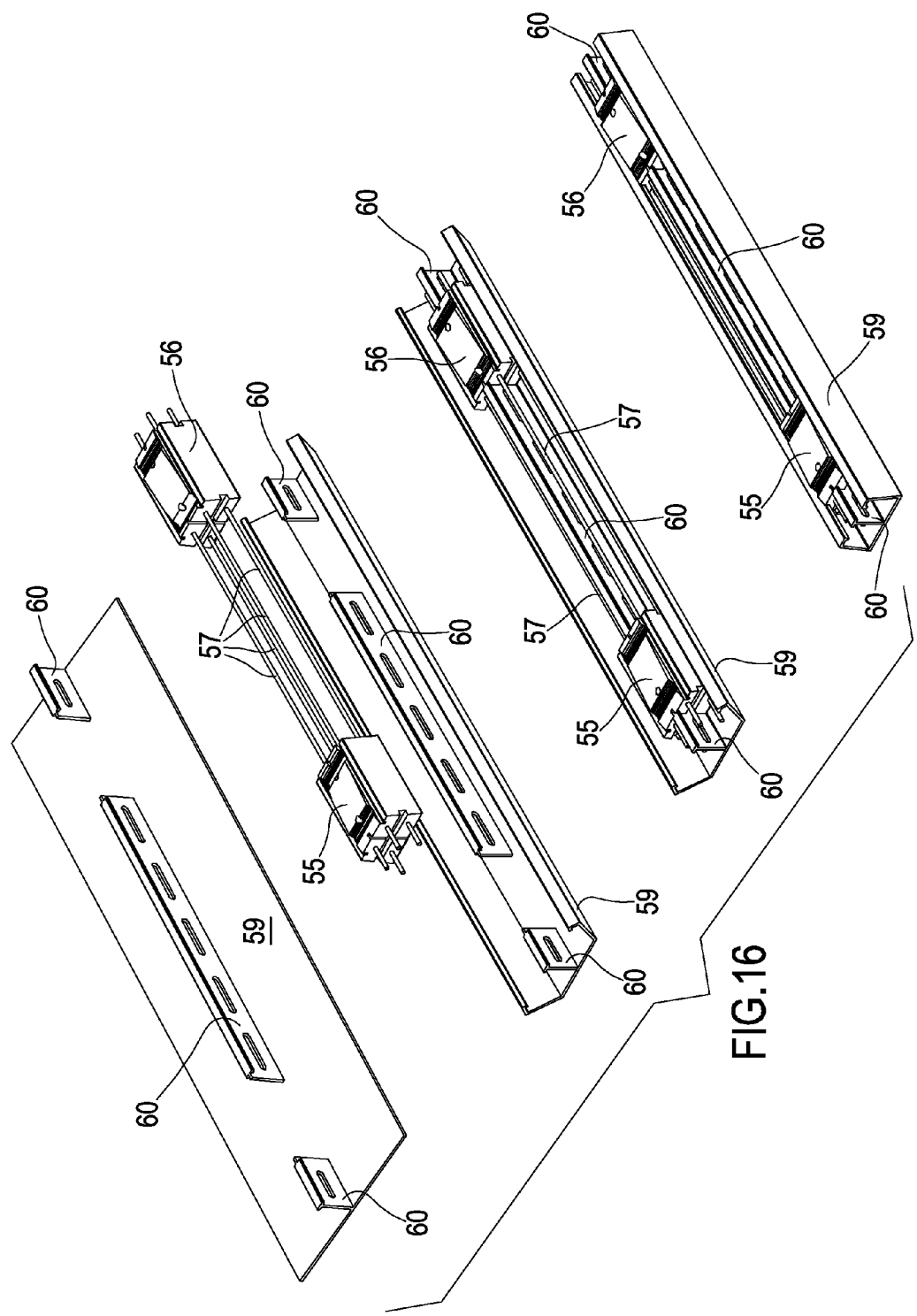
FIG. 16 is the assembly sequence of the partial assonometric view of the shaped structural core of FIG. 10.

After welding of the T-shaped outlined stiffening engagements 60, the metallic support and containment sheet 59 is folded, as shown in the sequence of FIG. 16.

Subsequently, the two composite material shaped blocks 55, 56 are positioned, as again shown by the sequence of FIG. 16.

Finally folding of the metallic support and containment sheet 59 is completed, as shown always by the sequence of FIG. 16.

Subsequently, the structure thus obtained (FIG. 16) is welded to the metallic reinforcement plate 58 (e.g. made of steel) whose design, shape and structure can be derived from the exploded view of FIG. 5.

Through slots 65 are made in the reinforcement plate 58 for the subsequent injection of the concrete inside the structure.

After welding of the reinforcement plate 58 has been ultimated, the cavities of the structure are filled with concrete through the through slots 65. Filling is carried out through an injection pump by means of nozzles (shown in FIG. 18 where they are indicated with 66) which insert the cement inside the structure through the through slots 65 of the steel reinforcement plate 58.

Some rubber plates 67 are provided at the base of the nozzles 66 which during injection seal the through slots 65 and prevent rash and harmful leakages of concrete.

Short sides of the inner structure under formation (shaped structural core) 52 are; instead, sealed by means of two opposite plugs 68, 69 which prevent side leakage and which are removed after drying of the concrete.

When the filling of concrete and its drying is ended, the inner structure 52 obtained (shown in FIG. 19) is covered by the outer coating shell 51 composed of a mixture of recycled plastic and rubber fragments obtained from EoLT (end of life tires).

Figure 20:
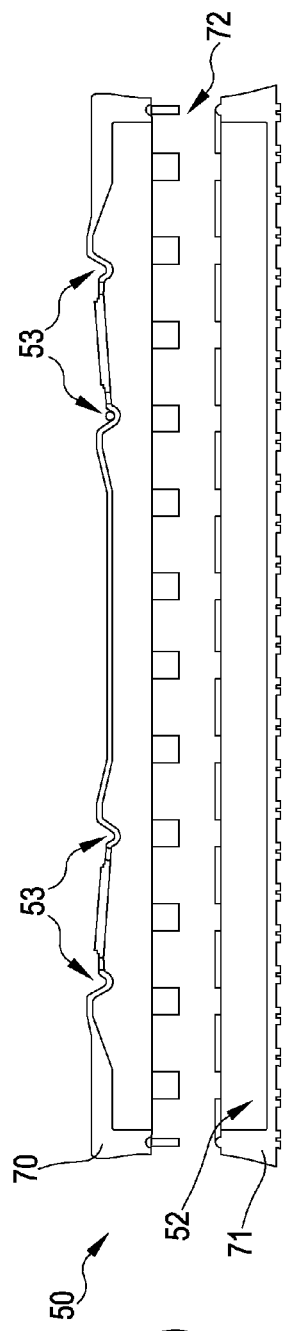
FIG. 20 is the exploded view of the outer cover of the composite railway sleeper of FIG. 5, according to a longitudinal section plane.
Figure 21:
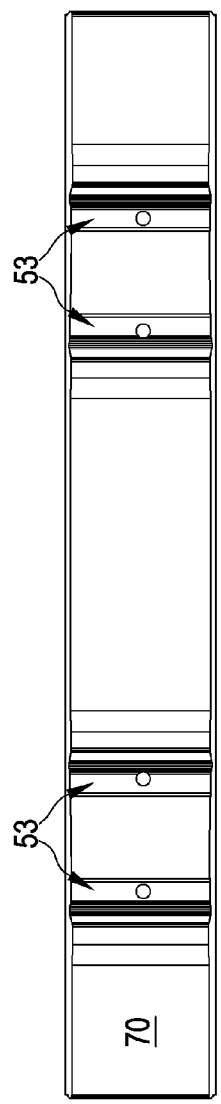
FIG. 21 is the plan view of the upper part of FIG. 20.
Figure 22:
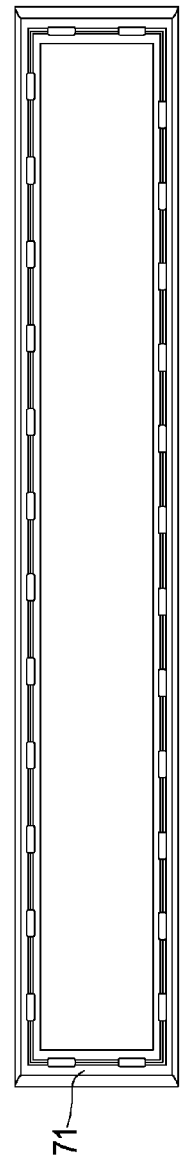
FIG. 22 is the plan view of the lower part of FIG. 20.
Figure 23:
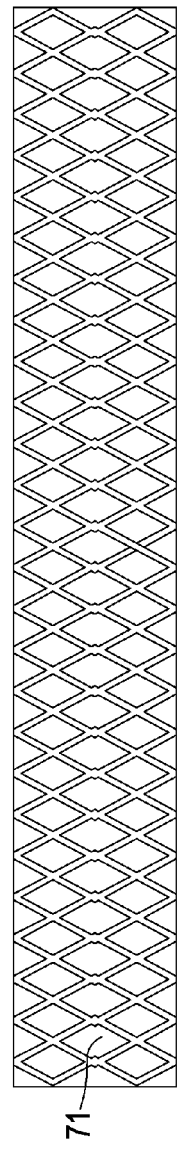
FIG. 23 is the view from below of the lower part of FIG. 20.
Figure 24:
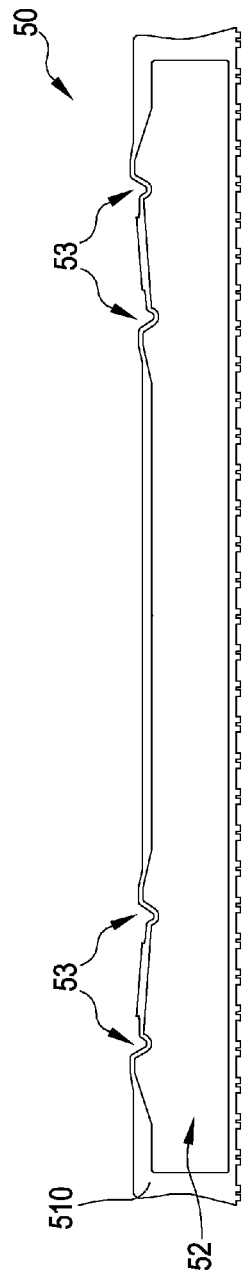
FIG. 24 is the view according to a longitudinal section plane of an embodiment of FIG. 20.
Figure 25:
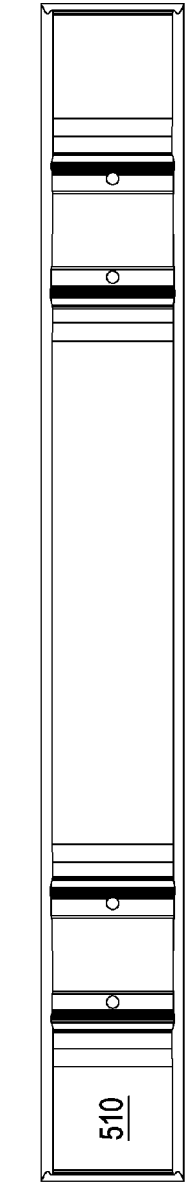
FIG. 25 is the plan view of the upper part of FIG. 24.
Figure 26:
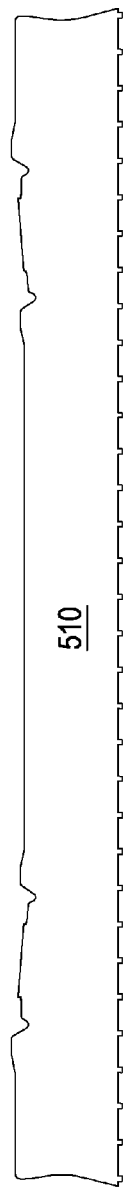
FIG. 26 is the view of FIG. 24 according to a longitudinal sec on plane.
Figure 27:
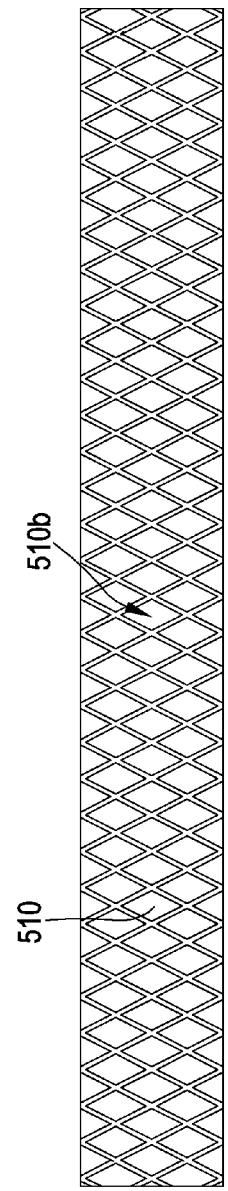
FIG. 27 is the view from below of the lower part of FIG. 24.

The outer coating shell, according to the shape, size and design that are particular to it, can be produced in two ways:
assembled outer coating 51 which is composed of an upper part and a lower part 71 joined together by means of an engagement system as a whole marked with 72 in figure FIG. 20, and further bounded each other by means of a high-strength glue that gives defined stability to the structural assembly;
one-piece outer coating 510 that ensures homogeneous coverage without joints as shown in section provided by FIG. 24 and subsequent FIGS. 25-27.

Figure 19:
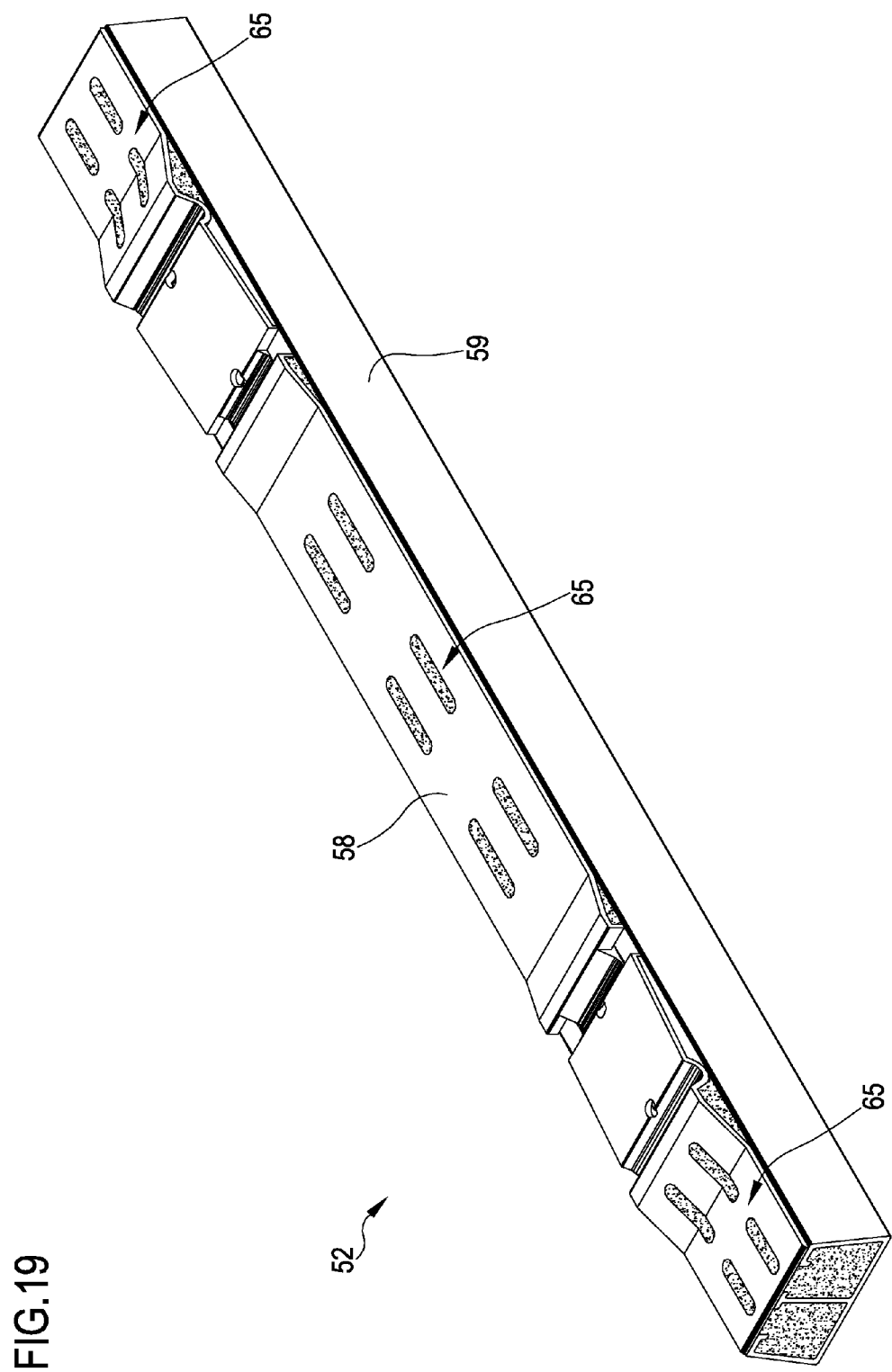
FIG. 19 is the complete assonometric view of the shaped structural core of the composite railway sleeper of FIG. 5.

After the covering with the outer coating shell 51 of the inner structure (shaped structural core) visible in FIG. 19, the railway sleeper 50 obtained presents some grooves 53 which, thanks to the particular shape, lend themselves to support the angular guide plates of the elastic type fastening system 64 with direct laying of the rail R, of the so-called SKL14 "Vossloh" or "Schwihag" type or similar.

Production process continues and ends with the pre-assembly of the whole fastening system (member) 64 of the rail R of the SKL14 "Vossloh" or "Schwihag" type or similar.

In another embodiment of the composite railway sleeper of the invention, shown partly in FIG. 28 and FIG. 29, the assembled outer coating shell 101 allows insertion within the structure of a piezoelectric system, overall indicated with 103, provided for the production and networking of electric energy, and/or housing of an under-rail plate with integrated data satellite transmission system.

In this case, therefore, the invention is designed for housing the piezoelectric system 103 for producing and networking electricity.

This is possible because, according to the present preferred embodiment, the composite shaped block 105, 106—made of rubber and placed in the under-rail section—of the shaped structural core 102 is replaced with a block model different from that one of FIG. 10 and detail of FIG. 10a: the shaped block 105, 106 presents a cavity 107 suitable to receive the piezoelectric system 103.

The composite railway sleeper 100 (shown at FIGS. 31 and 32) with piezoelectric system 103 according to the current alternative embodiment presents a metallic reinforcement plate 108 shown in FIG. 30 and which, with respect to the reinforcing plate 58 of FIG. 5, has a through hole 109 that is placed at the cavity 107 of each shaped block 105, 106, so that the piezoelectric button 110 is in direct contact with the inner surface of the outer coating shell 101 at the under-rail section.

Electricity produced is transferred to an external accumulator by means of a cable wiring 111 that connects the composite railway sleeper 100 with an accumulator (not shown) through the wiring room 112 made in the upper surface 101a of the outer coating shell 101.

In order to allow wiring of the composite railway sleeper 100, provided with piezoelectric system 103 and described in the present embodiment, it uses an outer coating shell 101 with wiring room 112 as shown in FIGS. 31 and 32, different from the outer coating shell 2 or 51 previously described.

The outer coating shell 101 of the composite railway sleeper 100 of the present invention can present a special room 113, made in the under-rail section, suitable to contain a plate 114 provided with an integrated satellite data transmission system, overall reported with 115, as it can be seen from FIGS. 33 and 34.

Pressure exerted by the passage of the train activates the satellite transmission system which forwards in real time for example the following data:
train speed;
train length;
wagons number;
track conditions;
distance between two consecutive trains;
distance between two opposite trains.

Said under-rail plate 114 with satellite data transmission system 115 is connected with an external signal repeater, not shown schematically, through a cable wiring, not shown, by means of a wiring room 116 (which may coincide or not with the wiring room 112 which allows the connection of the composite railway sleeper 110 with accumulator) arranged in the upper surface 101a of the outer coating shell 101.

The composite railway sleeper of the invention, in versions 1, 50 or 100 up to now described, of length L2 equal to 248.50 cm (see FIG. 7), can be produced in further three different sizes (see FIGS. 6, 8 and 9):
sleeper of length $L_1$ equal to 199.70 cm for use in railway systems at narrow gauge of 950 mm or 1,000 mm (FIG. 6);
sleeper of length $L_3$ equal to 238.20 cm for use in conventional railway, metropolitan and tram systems with maximum track speed equal to 190 km/h (FIG. 8);
sleeper of length L4 equal to 268.50 cm for use in high capacity and high speed railway systems with track speed higher than 250 km/h (FIG. 9).

Upon variation of the dimensions of the composite railway sleeper of the invention as specified above, the dimensions of the steel support and containment plate vary, and the related T-shaped outlined stiffening engagements vary according to what is shown for instance in FIG. 12 for the sleeper of length $L_3$ equal to 238.20 cm, in FIG. 13 for the sleeper of length $L_1$ equal to 199.70 cm.

Upon variation of the dimensions of the composite railway sleeper of the invention as specified above, the dimensions of the composite shaped blocks also vary.

Moreover, upon variation of the dimensions of the composite railway sleeper of the invention as specified above, dimensions of the steel reinforcement plate shown in FIG. 5 or in FIG. 30 vary.

Upon variation of the dimensions of the composite railway sleeper object of the present invention as specified above, the dimensions of the outer coating shell (either produced in a single body or assembled as described above) also vary.

As already mentioned, an object of the present invention is also a railway track which, for the sake of simplicity, is not fully illustrated in the drawings that follow.

Figure 17:
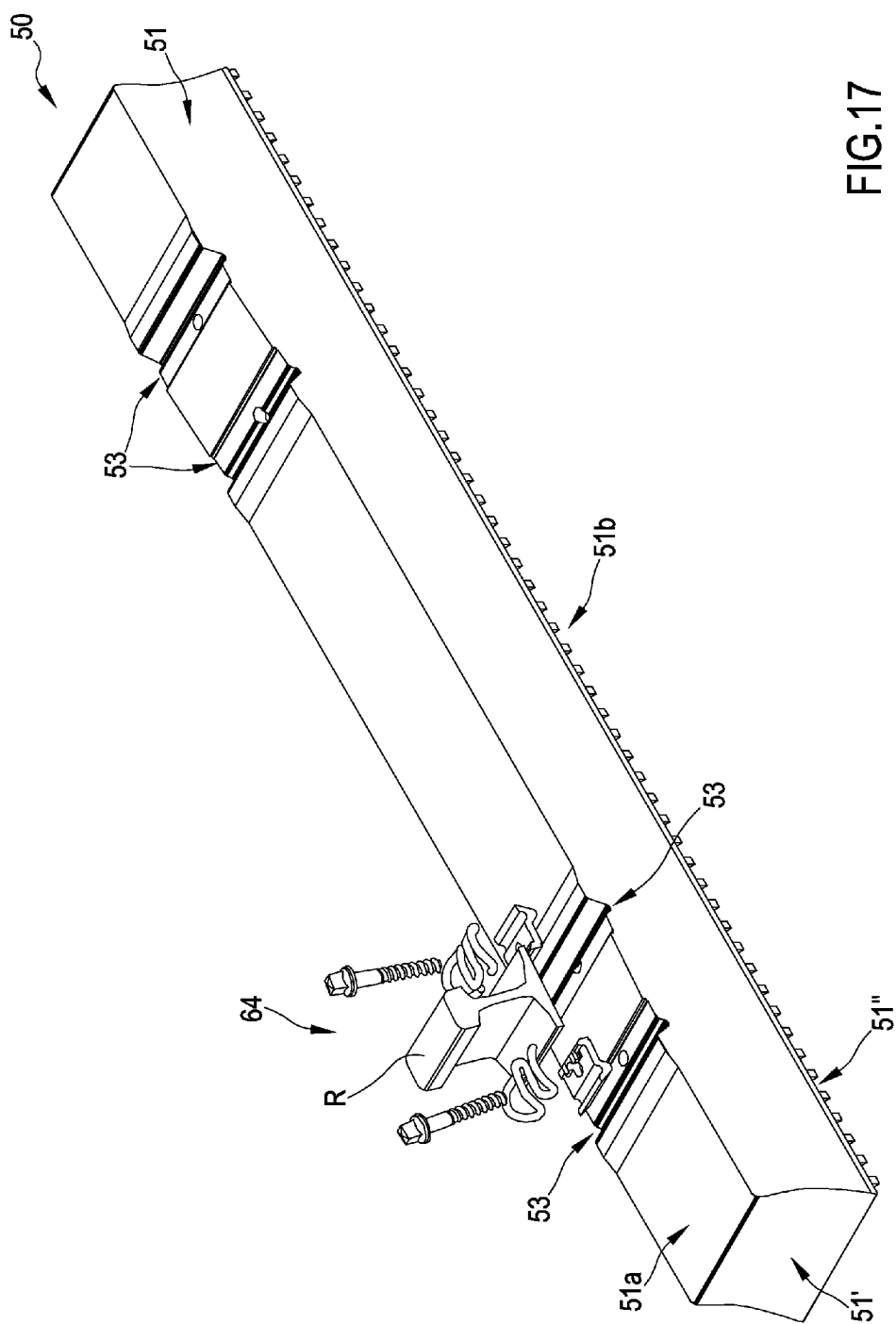
FIG. 17 is the final assonometric view of the composite railway sleeper of FIG. 5 provided with an elastic type fastening system for the rail/sleeper connection.
Figure 18:
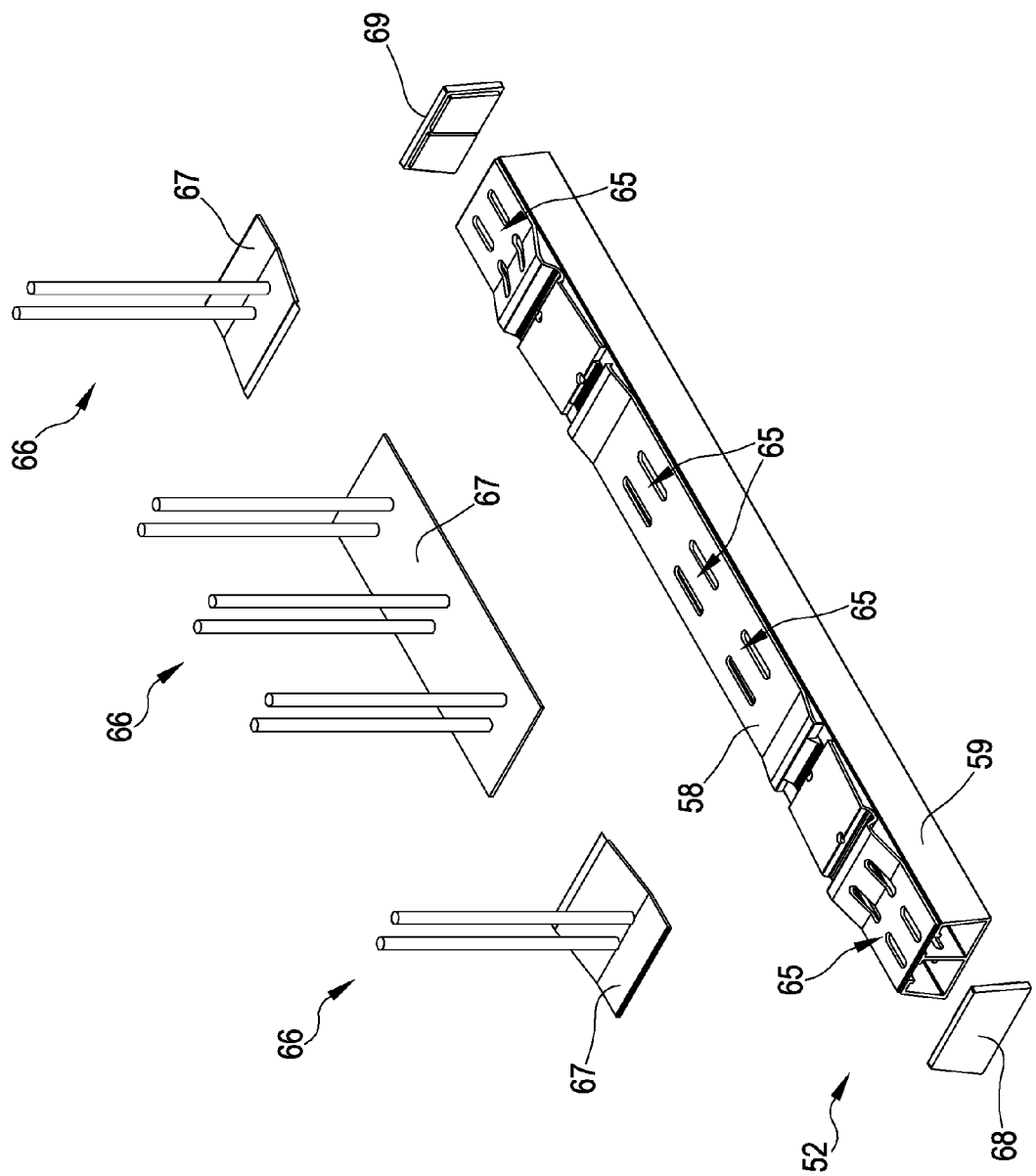
FIG. 18 is the assonometric and schematic view of the final part of the assembly process of the shaped structural core of the composite railway sleeper of FIG. 5.

The railroad track includes:
a pair of rails R parallel and spaced apart each other by a prefixed gauge;
a plurality of composite railway sleepers, of the type indicated with 1, 50 or 100, arranged at least predominantly between the rails one consecutive to the other and spaced apart each other in such a way as to define linear directions parallel each other and incident, generally orthogonally, the direction defined by the rails themselves and suitable to be placed superiorly close a foundation bed (rubble or ballast), each of these composite railway sleepers 1, 50 or 100 being of the type previously described and basically including:

an outer coating shell 2, 51 or 101 made of composite plastic material;

a shaped structural core 3, 52 or 102, made of a material comprising at least concrete contained within the outer coating shell 2, 51 or 101;

pre-assembled elastic type fastening systems, of the type indicated with 64 in FIG. 17, which connect each of the rails R with the composite railway sleepers 1, 50 or 100.

According to the invention, the outer coating shell 2, 51 or 101 presents in the upper outer face 2a, 51a or 101a two distinct and opposite groups of grooves 4 or 53 which receive the angular guide plates G of the pre-assembled "W" elastic type fastening systems 64 with direct laying of the rail.

According to the description just given, it is understood, therefore, that the composite railway sleeper, object of the present invention, achieves the purposes and reaches the advantages previously mentioned.

The composite railway sleeper of the invention has therefore particular shape, geometry, weight, design and structure, supports a "W" elastic type fastening system (formed by mechanical members), with direct laying of the rail, (for example that one known as SKL14 "Vossloh fastening system" or "Schwihag fastening system" or similar) while not being entirely made up of prestressed reinforced concrete and is advantageously used in high-speed and/or high capacity lines, even beyond 250 km/h, with gauge equal to 1,435 mm.

Some of the innovative features of the composite railway sleeper of the invention compared to the prior art, therefore, consist in:

outer coating with a shell, made of plastic material, preferably a mixture of plastic material and recycled rubber obtained from EoLT (end of life tires);

upper outer face of outer coating shell having a pair of groups of grooves of particular shape and design, preparatory to receive "W" elastic fastening systems, with direct laying of the rail (normally known in jargon as SKL14 "Vossloh", "Schwihag" fastening systems or similar);

particular structure, shape and design of the shaped structural core designed to receive a piezoelectric system aimed at the production and networking of electricity;

particular structure, shape and design of the outer coating shell, designed to house an under-rail plate provided with an integrated satellite data transmission system.

Compared to the railway sleepers of similar application, intended to high speed tracklines, as mentioned made of prestressed reinforced concrete, the composite railway sleeper of the present invention implies a drastic reduction of the pulverization of the ballast and a considerable increase of the strength to lateral displacement of the track due to the passage of the train.

The composite railway sleeper of the invention also involves considerable speed assembly and high installation rapidity during construction, renovation and maintenance works since the rail fastening system is pre-assembled at factory.

It is, finally, clear that several other changes could be made to the composite railway sleeper concerned, without departing from the principle of novelty intrinsic in the inventive idea expressed herein, as it is clear that, in the practical implementation of the invention, materials, shapes and sizes of the illustrated details could be changed, as needed, and replaced with others technically equivalent.

Where the constructive features and techniques mentioned in the following claims are followed by reference numbers or signs, those reference signs have been introduced with the sole objective of increasing the intelligibility of the claims themselves and therefore they have no limiting effect on the interpretation of each element identified, by way of example only, by these reference signs.

The invention claimed is:

1. A composite railway sleeper comprising:
   an outer coating shell made of composite plastic material; and
   a shaped structural core, made of a material comprising at least a prestressed reinforced concrete contained within said outer coating shell,
   characterized in that said outer coating shell comprises in an upper outer face two distinct and opposite groups of grooves suitable to receive angular guide plates belonging to pre-assembled elastic rail fastening systems for connection of two respective rails with said railway sleeper and further in that said material of said shaped structural core comprises steel in a shape of outlined stiffening engagements embedded in said concrete, wherein the material of said shaped structural core further comprises a mixture of plastic material and recycled rubber in a pair of composite blocks embedded in said concrete and connected to each other through one or more steel bars embedded in said concrete, characterized in that said outlined stiffening engagements are welded to a folded containment and support sheet, further characterized in that each of said outlined stiffening engagements comprises at least one side edge with a guide tooth that fits into a channel of vertical engagement made in at least one opposite side of each said composite blocks.

2. The composite railway sleeper according to claim 1 characterized in that said distinct and opposite groups of grooves are symmetrically arranged in relationship to each other with respect to a transverse symmetry axis (Y) of said outer coating shell.

3. The composite railway sleeper according to claim 1 characterized in that said composite plastic material comprises recycled plastic and/or recycled rubber.

4. The composite railway sleeper according to claim 3 characterized in that said recycled rubber includes fragments, frayed fibres, granules or combinations thereof resulting from shredded end of life tires (EoLT) of vehicles.

5. The composite railway sleeper according to claim 1 characterized in that said material of said shaped structural core comprises a mixture of plastic material and recycled rubber, in a shape of a pair of composite shaped blocks embedded in said concrete and connected to each other through one or more steel bars embedded in said concrete.

6. The composite railway sleeper according to claim 1 characterized in that it comprises a metallic reinforcement plate stably coupled above said shaped structural core and contained inside said outer coating shell.

7. The composite railway sleeper according to claim 1, further comprising a metallic reinforcement plate stably coupled above said shaped structural core and contained inside said outer coating shell, characterized in that said metallic reinforcement plate presents a plurality of through slots suitable to allow passage of said concrete when it is injected into said folded containment and support sheet.

8. The composite railway sleeper according to claim 1 wherein said outer coating shell further comprises side faces with an "S" shaped curvature and a lower face of said outer coating shell comprising a net design suitable to increase and improve interaction between a ballast foundation bed and said railway sleeper whereby lateral displacement of a railway track is reduced during passage of a train.

9. The composite railway sleeper according to claim 1, characterized in that said outer coating shell is an assembled body composed of an upper part and a lower part joined together by means of a coupling system and a high-strength glue.

10. The composite railway sleeper according to claim 1, characterized in that said outer coating shell is a single body suitable to ensure uniform coverage without joints.

11. The composite railway sleeper according to claim 9 characterized in that it further comprises a piezoelectric system coupled with said shaped structural core and in direct contact with an inner surface immediately below said rails of said outer coating shell, and suitably actuated by a pressure exerted on said composite railway sleeper by passage of a train on a track in order to produce electric energy and transfer it through a cable wiring to an external accumulator and making it available to an electrical network.

12. The composite railway sleeper according to claim 5, wherein said outer coating shell is an assembled body comprising an upper part and a lower part joined together by means of a coupling system and a high-strength glue, and further comprising a piezoelectric system coupled with said shaped structural core and in direct contact with an inner surface immediately below said rails of said outer coating shell and suitably actuated by a pressure exerted on said composite railway sleeper by passage of a train on a track in order to produce electric energy and transfer it through a cable wiring to an external accumulator and making it available to an electrical network, characterized in that said piezoelectric system comprises an electric contact housed in a cavity made at least in an upper face of at least one of said composite shaped Hocks.

13. The composite railway sleeper according to claim 1 further comprising a satellite data transmission system coupled with said outer coating shell actuated by pressure exerted on said composite railway sleeper by passage of a train on a track whereby at least data regarding train speed, train length, number of wagons, track conditions, distance between two consecutive trains and distance between two opposite trains is transmitted.

14. The composite railway sleeper according to claim 13 characterized in that said satellite data transmission system is integrated in an under-rail plate housed in a room in an upper surface of said outer coating shell and connected with an external signal repeater through a wiring cable.

15. Railway track comprising:
a pair of rails parallel and spaced apart each other by a prefixed gauge;
a plurality of composite railway sleepers, arranged at least predominantly between said rails one consecutive and spaced apart each other in such a way as to define linear directions parallel each other and in a direction defined by said rails and suitable to be placed superiorly close a ballast foundation bed, each of said composite railway sleepers including:
an outer coating shell made of composite plastic material;
a shaped structural core, made of a material comprising at least a prestressed reinforced concrete contained within said outer coating shell;
pre-assembled elastic rail fastening systems which connect each of said rails with said railway sleeper,
characterized in that said outer coating shell further comprises in an upper outer face two distinct and opposite groups of grooves which receive angular guide plates of said pre-assembled elastic rail fastening systems and further in that said material of said shaped structural core comprises steel in a shape of outlined stiffening engagements embedded in said concrete wherein the material of said shaped structural core further comprises a mixture of plastic material and recycled rubber in a pair of composite blocks embedded in said concrete and connected to each other through one or more steel bars embedded in said concrete, characterized in that said outlined stiffening engagements are welded to a folded containment and support sheet, further characterized in that each of said outlined stiffening engagements comprises at least one side edge with a guide tooth that fits into a channel of vertical engagement made in at least one opposite side of each said composite blocks.

16. A composite railway sleeper comprising:
an outer coating shell made of composite plastic material; and
a shaped structural core, made of a material comprising at least a prestressed reinforced concrete contained within said outer coating shell,
characterized in that said outer coating shell comprises in an upper outer face two distinct and opposite groups of grooves suitable to receive angular guide plates belonging to pre-assembled elastic rail fastening systems for connection of two respective rails with said railway sleeper and further in that said material of said shaped structural core comprises steel in a shape of outlined stiffening engagements embedded in said concrete, wherein the material of said shaped structural core further comprises a mixture of plastic material and recycled rubber in a pair of composite blocks embedded in said concrete and connected to each other through one or more steel bars embedded in said concrete, characterized in that said outlined stiffening engagements are welded to a folded containment and support sheet, further comprising a metallic reinforcement plate stably coupled above said shaped structural core and contained inside said outer coating shell, characterized in that said metallic reinforcement plate presents a plurality of through slots suitable to allow passage of said concrete when it is injected into said folded containment and support sheet.

17. Railway track comprising:
a pair of rails parallel and spaced apart each other by a prefixed gauge;
a plurality of composite railway sleepers, arranged at least predominantly between said rails one consecutive and spaced apart each other in such a way as to define linear directions parallel each other and in a direction defined by said rails and suitable to be placed superiorly close a ballast foundation bed, each of said composite railway sleepers including:
an outer coating shell made of composite plastic material;
a shaped structural core, made of a material comprising at least a prestressed reinforced concrete contained within said outer coating shell;
pre-assembled elastic rail fastening systems which connect each of said rails with said railway sleeper,
characterized in that said outer coating shell further comprises in an upper outer face two distinct and opposite groups of grooves which receive angular guide plates of said pre-assembled elastic rail fastening systems and further in that said material of said shaped structural core comprises steel in a shape of outlined stiffening engagements embedded in said concrete, characterized in that said outlined stiffening engagements are welded to a folded containment and support sheet;

further comprising a metallic reinforcement plate stably coupled above said shaped structural core and contained inside said outer coating shell, characterized in that said metallic reinforcement plate presents a plurality of through slots suitable to allow passage of said concrete when it is injected into said folded containment and support sheet.

18. Railway track of claim 17 wherein the material of said shaped structural core further comprises a mixture of plastic material and recycled rubber in a pair of composite blocks embedded in said concrete and connected to each other through one or more steel bars embedded in said concrete, characterized in that each of said outlined stiffening engagements comprises at least one side edge with a guide tooth that fits into a channel of vertical engagement made in at least one opposite side of each said composite blocks.

\* \* \* \* \*